Figures 1, 2, 3:
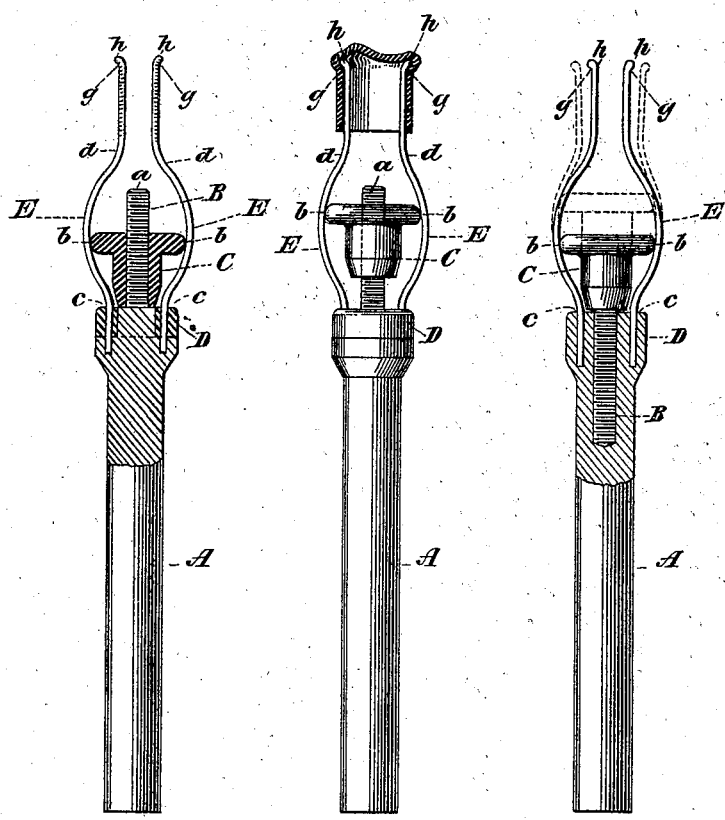

No. 647,956. Patented Apr. 24, 1900.
N. R. FORD.
DENTAL TOOL.
(Application filed Aug. 8, 1899.)
(No Model.)

WITNESSES:

Nelson Robert Ford
INVENTOR

BY
ATTORNEY

UNITED STATES PATENT OFFICE.

NELSON ROBERT FORD, OF NEW YORK, N. Y.

DENTAL TOOL.

SPECIFICATION forming part of Letters Patent No. 647,956, dated April 24, 1900.

Application filed August 8, 1899. Serial No. 726,511. (No model.)

*To all whom it may concern:*

Be it known that I, NELSON ROBERT FORD, a subject of the Queen of Great Britain, residing in the borough of Brooklyn, in the city of New York, in the county of Kings and State of New York, have invented a new and useful Dental Tool or Instrument of Peculiar Construction, said invention being fully and clearly described in the following specification.

The object of my invention is to construct and provide a dental tool or instrument that may be quickly, easily, and readily adjusted for retaining or holding crowns, caps, or bands, &c., without slipping while grinding, filing, and polishing the same.

The invention comprises a stem or handle with a threaded neck or shank, a thumb-nut in screw-threaded engagement with the said neck, a plurality of retaining springs or spring-arms which are outwardly curved around the said thumb-nut, and a fixed collar fitting upon the stem or handle and provided with grooves through which the retaining-springs pass, so that the said springs are rigidly attached at their lower ends to the said handle. These springs or spring-arms are susceptible of adjustment by the action of the thumb-nut upon them. The nut pushes them apart as it is screwed up or down upon the neck, and the natural elasticity of the springs or spring-arms causes them to return to their normal position when the pressure of the nut is removed.

When it is desired to fit a crown, cap, or band upon the holder, the retaining springs or spring-arms are first adjusted to their normal or minimum expansion. The crown, cap, or band is then placed over or upon the retaining-points of the springs or spring-arms, and these are then adjusted or expanded, so that the retaining-points will firmly grip the crown, cap, or band, and thereby prevent slipping.

The invention is illustrated by the accompanying drawings, similar letters being used for similar parts throughout the several views, in which—

Figure 1 is a side elevation, partly in section, of the holder with the retaining springs or spring-arms adjusted to about their normal or minimum expansion. Fig. 2 also shows a side elevation of the holder, having placed thereon a crown, the said crown being gripped by the retaining springs or spring-arms; and Fig. 3 illustrates a sectional view of a modification of said holder.

A is a stem or handle, having one end thereof reduced in circumference to form a neck B, upon which is cut a screw-thread $a$.

C is an adjusting-nut mounted upon and in screw-threaded engagement with the thread $a$ and which may be regulated at the will of the operator.

$b$ is a flange or rim of the adjusting-nut C.

D is a collar fitting upon the stem or handle A and provided with grooves $c\ c$. This collar is fastened to the said stem or handle A by any suitable means.

E E are elastic retaining springs or spring-arms. These springs or spring-arms extend from and are fastened and held in position to the said stem or handle A through grooves $c\ c$ in the collar D and are curved outwardly and then inwardly around the nut or set-screw C to points $d\ d$, whence they again extend slightly outwardly or nearly parallel to points $g\ g$, and thence are bent slightly outwardly to points $h\ h$.

The free extremities of the spring-arms may be finished in any manner suitable for fitting into and gripping tooth crowns, caps, bands, and the like. I style these extremities "retaining-points," but do not thereby limit myself to any special conformation thereof.

It may be found desirable to have the springs or spring-arms E E serrated on their outward surfaces between points $d\ d$ and $h\ h$ to aid in preventing the slipping of the crowns, caps, or bands when fitted upon them.

It is not my intention to confine myself to the precise form of holder shown and described, as certain modifications might be made without departing from the spirit of the invention—as, for instance, the springs may be inserted in any suitable manner or their curvature slightly varied. Another possible variation would be to have the nut mounted upon a screw-threaded neck which engages with a corresponding screw-threaded aperture in the handle, as illustrated by Fig. 3.

Having described my said invention, what I claim as new, and desire to secure by Letters Patent, is—

1. A dental tool or instrument comprising in combination, a handle having a screw-threaded neck, upon which engages a nut, and spring-arms attached to said handle, curving outwardly around said nut and adjustable thereby and capable of fitting into and gripping with their free extremities, tooth crowns, caps, bands or similar articles, all constructed and operating substantially as described.

2. In a dental tool or instrument, the combination of suitably-curved spring-arms capable of fitting into and gripping with their free extremities, tooth crowns, caps, bands or similar articles, and rigidly attached at their other extremities to a suitable handle, and adjustable by means of a disk vertically movable within their curvature, substantially as described.

In testimony whereof I have signed this specification in the presence of two subscribing witnesses.

NELSON ROBERT FORD.

Witnesses:
JAMES G. K. LEE,
JOHN TOBIN.